US011879595B2

(12) United States Patent
Bollinger et al.

(10) Patent No.: US 11,879,595 B2
(45) **Date of Patent: *Jan. 23, 2024**

(54) CRYOSPHERE

(71) Applicant: Cryoport, Inc., Brentwood, TN (US)

(72) Inventors: Bret Bollinger, Yorba Linda, CA (US); Hovhannes Melikyan, Granada Hills, CA (US)

(73) Assignee: Cryoport, Inc., Brentwood, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,915

(22) Filed: Mar. 3, 2022

(65) Prior Publication Data

US 2022/0186885 A1 Jun. 16, 2022

Related U.S. Application Data

(63) Continuation of application No. 15/865,589, filed on Jan. 9, 2018, now Pat. No. 11,268,655.

(51) Int. Cl.

*F17C 13/00* (2006.01)
*F17C 13/06* (2006.01)
*F17C 13/08* (2006.01)

(52) U.S. Cl.

CPC ............ *F17C 13/006* (2013.01); *F17C 13/06* (2013.01); *F17C 13/086* (2013.01); (Continued)

(58) Field of Classification Search

CPC ...... F17C 13/006; F17C 13/086; F17C 13/06; F17C 2270/0509; F17C 2205/0107; F17C 2205/0311; F17C 2203/0391; F17C 2203/0128; F17C 2203/036; F17C 2203/01; F17C 2203/0491; F17C 2203/0439; F17C 2203/014

See application file for complete search history.

(56) References Cited

U.S. PATENT DOCUMENTS 1,507,370 A 9/1924 Freeble
1,816,057 A 7/1931 Sager
(Continued)

FOREIGN PATENT DOCUMENTS

CN 104930347 A 9/2015
CN 103322117 B 1/2016
(Continued)

OTHER PUBLICATIONS

GB; Examination Report dated Jan. 9, 2023 in Application No. 2012312.1.
(Continued)

*Primary Examiner* — Brian M King
(74) *Attorney, Agent, or Firm* — Snell & Wilmer L.L.P.

(57) ABSTRACT

Methods, apparatus, and device, for a cryogenic storage system that stores and/or transports a liquid or gas at a temperature below ambient temperature. The cryogenic storage system has an enclosure and a cavity. The cryogenic storage system has a dewar that is positioned within the cavity of the enclosure. The dewar has a payload area that is configured to hold a liquid below ambient temperature. The dewar is configured to hold a liquid below ambient temperature and passively stabilize in an upright position. The dewar is formed with an inner wall and an outer wall and has an opening that allows access to the payload area.

18 Claims, 10 Drawing Sheets

(52) U.S. Cl.
CPC .... *F17C 13/005* (2013.01); *F17C 2201/0128* (2013.01); *F17C 2203/0391* (2013.01); *F17C 2203/0629* (2013.01); *F17C 2205/0107* (2013.01); *F17C 2205/0311* (2013.01); *F17C 2221/014* (2013.01); *F17C 2223/0161* (2013.01); *F17C 2250/034* (2013.01); *F17C 2250/0439* (2013.01); *F17C 2250/0491* (2013.01); *F17C 2260/036* (2013.01); *F17C 2270/01* (2013.01); *F17C 2270/0509* (2013.01)

(56) References Cited

U.S. PATENT DOCUMENTS

| | | | |
|---|---|---|---|
| 2,722,336 | A | 11/1955 | Wexler et al. |
| 3,108,706 | A | 10/1963 | Matsch et al. |
| 3,455,480 | A | 7/1969 | Mitchell |
| 3,555,904 | A | 1/1971 | Lenker |
| 3,713,560 | A | 1/1973 | Slysh |
| 3,717,005 | A | 2/1973 | McGrew et al. |
| 3,948,409 | A | 4/1976 | Ovchinnikov et al. |
| 4,140,073 | A | 2/1979 | Androulakis |
| 4,306,425 | A | 12/1981 | Sitte et al. |
| 4,365,576 | A | 12/1982 | Cook |
| 4,411,138 | A | 10/1983 | Leithauser |
| 4,455,842 | A | 6/1984 | Granlund |
| 4,694,655 | A | 9/1987 | Seidel et al. |
| 4,729,494 | A | 3/1988 | Peillon et al. |
| 4,790,141 | A | 12/1988 | Glascock |
| 4,919,300 | A | 4/1990 | Anderson et al. |
| 5,219,058 | A | 6/1993 | Sundseth |
| 5,619,857 | A | 4/1997 | Caldwell |
| 6,186,356 | B1 | 2/2001 | Berkley |
| 6,467,642 | B2 | 10/2002 | Mullens et al. |
| 6,490,880 | B1 | 12/2002 | Walsh |
| 6,539,360 | B1 | 3/2003 | Kadaba |
| 6,673,594 | B1 | 1/2004 | Owen et al. |
| 7,627,926 | B2 | 12/2009 | Williams |
| 7,881,987 | B1 | 2/2011 | Hart |
| 8,220,107 | B2 | 7/2012 | Williams |
| 8,387,818 | B2 | 3/2013 | Cognard |
| 8,397,343 | B2 | 3/2013 | Williams |
| 8,673,594 | B2 | 3/2014 | Filbin et al. |
| 9,139,351 | B2 | 9/2015 | Chou |
| 9,292,824 | B1 | 3/2016 | Freeman |
| 9,378,442 | B2 | 6/2016 | Barnings |
| 2002/0083718 | A1 | 7/2002 | Emmel |
| 2002/0084277 | A1 | 7/2002 | Mullens et al. |
| 2002/0099567 | A1 | 7/2002 | Joao |
| 2002/0102992 | A1 | 8/2002 | Koorapaty |
| 2002/0113070 | A1 | 8/2002 | Emmel |
| 2002/0166326 | A1 | 11/2002 | Giesy et al. |
| 2002/0167500 | A1 | 11/2002 | Gelbman |
| 2003/0137968 | A1 | 7/2003 | Lareau et al. |
| 2004/0215532 | A1 | 10/2004 | Boman |
| 2004/0236635 | A1 | 11/2004 | Publicover |
| 2005/0046584 | A1 | 3/2005 | Breed |
| 2005/0171738 | A1 | 8/2005 | Kadaba |
| 2005/0234785 | A1 | 10/2005 | Burman |
| 2005/0246192 | A1 | 11/2005 | Jauffred et al. |
| 2006/0080819 | A1 | 4/2006 | McAllister |
| 2006/0121437 | A1 | 6/2006 | Poo et al. |
| 2006/0168644 | A1 | 7/2006 | Richter et al. |
| 2007/0009119 | A1 | 1/2007 | Pohle et al. |
| 2007/0028642 | A1 | 2/2007 | Glade et al. |
| 2007/0209376 | A1 | 9/2007 | Boer |
| 2007/0268138 | A1 | 11/2007 | Chung et al. |
| 2008/0094209 | A1 | 4/2008 | Braun |
| 2008/0162304 | A1 | 7/2008 | Ourega |
| 2008/0291033 | A1 | 11/2008 | Aghassipour |
| 2009/0014537 | A1 | 1/2009 | Gelbman |
| 2009/0045311 | A1 | 2/2009 | Seyedin |
| 2009/0293524 | A1 | 12/2009 | Vezina et al. |
| 2009/0314835 | A1 | 12/2009 | Jackson |
| 2010/0080168 | A1 | 4/2010 | Fukuyama |
| 2010/0299278 | A1 | 11/2010 | Kriss et al. |
| 2011/0140850 | A1 | 6/2011 | Wassel |
| 2011/0155745 | A1 | 6/2011 | Chou et al. |
| 2011/0210029 | A1 | 9/2011 | Ontjes |
| 2011/0216178 | A1 | 9/2011 | Carpenter |
| 2011/0281352 | A1 | 11/2011 | Raeder et al. |
| 2013/0014517 | A1 | 1/2013 | Diederichs et al. |
| 2014/0270928 | A1 | 9/2014 | Howard et al. |
| 2015/0257558 | A1 | 9/2015 | May |
| 2016/0003270 | A1 | 1/2016 | Franklin |
| 2016/0078987 | A1 | 3/2016 | Simpkins |
| 2016/0153665 | A1 | 6/2016 | Adeleye |
| 2019/0211971 | A1 | 7/2019 | Bollinger et al. |
| 2019/0248562 | A1 | 8/2019 | Marotta |
| 2020/0017817 | A1 | 1/2020 | Kelly-Greene |
| 2020/0149685 | A1 | 5/2020 | Lee et al. |

FOREIGN PATENT DOCUMENTS

| | | | |
|---|---|---|---|
| CN | 106005766 | A | 10/2016 |
| CN | 208881873 | U | 5/2019 |
| DE | 102015205969 | A1 | 10/2016 |
| EP | 2576384 | B1 | 7/2014 |
| EP | 3620233 | A1 | 3/2020 |
| FR | 585827 | A | 3/1925 |
| GB | 2494651 | A | 3/2013 |
| JP | S5390123 | U | 7/1978 |
| JP | H0712295 | A | 1/1995 |
| JP | H0958714 | A | 3/1997 |
| JP | 09-329297 | A | 12/1997 |
| JP | 2001180797 | A | 7/2001 |
| JP | 2004-517007 | A | 6/2004 |
| JP | 3958213 | B2 | 8/2007 |
| JP | 2012163129 | A | 8/2012 |
| JP | 2014-527610 | A | 10/2014 |
| JP | 2015048925 | A | 3/2015 |
| NL | 1033089 | C2 | 6/2008 |
| SU | 1321986 | A1 | 7/1987 |
| TW | 201708531 | A | 3/2017 |
| WO | 2002053967 | A1 | 11/2002 |
| WO | 2011147384 | A2 | 12/2011 |
| WO | 2016086143 | A1 | 6/2016 |
| WO | 2020049123 | A1 | 3/2020 |

OTHER PUBLICATIONS

JP; Examination Report dated Feb. 2, 2023 in Application No. 2022-145286.

US; Final Office Action dated Dec. 9, 2023 in U.S. Appl. No. 16/730,506.

EP; Supplemental Search Report dated Aug. 21, 2021 in Application Serial No. EP19738000.9.

PCT; International Search Report & Written Opinion dated Mar. 23, 2021 in PCT Application No. PCT/US2020/063823.

SG; Search Report & Written Opinion dated Oct. 28, 2021 in Application Serial No. SG11202006224Y.

PCT: Preliminary Report on Patentability dated Jul. 23, 2020 in PCT Application No. PCT/US2019/012553.

Screenshot ( 1 pg.) of You Tube Video entitled “Upright Positioner”; WAK Chemie Medical GmbH Germany, published on Dec. 16, 2011; retrieved on Mar. 31, 2020 from URL: https://www.youtube.com/watch?v=LJeUh_pn2Mo.

USPTO; Non-Final Office Action dated Dec. 2, 2011 in U.S. Appl. No. 12/658,641.

USPTO; Final Office Action dated Aug. 14, 2012 in U.S. Appl. No. 12/658,641.

USPTO; Non-Final Office Action dated Sep. 11, 2015 in U.S. Appl. No. 12/658,641.

USPTO; Final Office Action dated May 10, 2012 in U.S. Appl. No. 12/852,413.

USPTO; Advisory Action dated Jul. 31, 2012 in U.S. Appl. No. 12/852,413.

USPTO; Non-Final Office Action dated Jun. 18, 2014 in U.S. Appl. No. 12/852,413.

USPTO; Non-Final Office Action dated Jun. 17, 2016 in U.S. Appl. No. 12/852,413.

(56) References Cited

OTHER PUBLICATIONS

USPTO; Final Office Action dated Nov. 29, 2016 in U.S. Appl. No. 12/852,413.
USPTO; Non-Final Office Action dated Jul. 25, 2017 in U.S. Appl. No. 14/589,768.
USPTO; Final Office Action dated Feb. 7, 2018 in U.S. Appl. No. 14/589,768.
USPTO; Non-Final Office Action dated Jun. 19, 2018 in U.S. Appl. No. 14/589,768.
USPTO; Final Office Action dated Dec. 27, 2018 in U.S. Appl. No. 14/589,768.
PCT; International Search Report dated May 31, 2002 in International Application No. PCT /US2001/049684.
PCT; International Search Report dated Jun. 28, 2010 in International Application No. PCT /US2010/023252.
PCT; Written Opinion of International Search Authority dated Jun. 28, 2010 in International Application No. PCT/US2010/023252.
PCT; International Preliminary Report on Patentability dated Mar. 22, 2013 in International Application No. PCT/US2010/023252.
Electronic Reusable Paper, http://www2.parc.com/hsl/projects/gyricon/, (Oct. 2005).
UK; First Examination Report dated Feb. 16, 2022 in application No. 2012312.1.
JP; First Examination Report dated Feb. 28, 2022 in application No. 2020-557129.
USPTO; Final Office Action dated Aug. 21, 2020 in U.S. Appl. No. 15/865,589.
CN; Notice of First Office Action dated Oct. 25, 2021 in Chinese Application No. 201980011145.2.
USPTO; Notice of Allowance dated Dec. 22, 2022 in U.S. Appl. No. 15/865,589.
USPTO; Non-Final Office Action dated Aug. 9, 2019 in U.S. Appl. No. 15/865,589.
USPTO; Non-Final Office Action dated April 3, 3020 in U.S. Appl. No. 15/865,589.
PCT: International Search Report & Written Opinion dated May 8, 2019 in PCT Application No. PCT/US2019/012553.
CN; Second Examination Report dated May 10, 2022 in application No. 201980011145.2.
PCT; International Preliminary Report on Patentability dated Jul. 5, 2022 in PCT Application No. PCT/US2020/063823.
EP: Supplemental Search Report dated Oct. 25, 2022 in EP20909114.9.
UK; 2nd Examination Report dated Jul. 29, 2022 in Application No. GB2012312.1.
JP; Notice of Allowance dated Aug. 26, 2022 in Application No. 2020-557129.
CN; Notice of Allowance dated Nov. 4, 2022 in Application No. 201980011145.2.
SG: 2nd Written Opinion dated Mar. 1, 2023 in Singapore Application Serial No. 11202006224.
UK: 1st Examination Report dated Mar. 27, 2023 in UK Application Serial No. 2210923.5.
CH: 1st Office Action dated Mar. 9, 2023 in Switzerland Application Serial No. CH000122 12022.
USPTO: Final Office dated Mar. 27, 2023 in U.S. Appl. No. 16/730,506.
USPTO; Restriction Requirement dated Jan. 20, 2022 in U.S. Appl. No. 16/730,506.
USPTO; Non-Final Office Action dated Apr. 11, 2022 in U.S. Appl. No. 16/730,506.
UKIPO; Notice of Intention to Grant dated Mar. 23, 2023 in Application No. GB2012312.1.
USPTO; Non-Final Office Action dated Aug. 23, 2023 in U.S. Appl. No. 16/730,506.
CNIPA; Notice of the First Office Action dated Aug. 31, 2023 for Application No. 202080091726.4.
AU; Notice of the First Office Action dated Nov. 7, 2023 in Application No. 2019207475.
UK; Notice of Intent to Grant dated Oct. 10, 2023 in Application No. 2210923.5.

CRYOSPHERE

CROSS REFERENCED TO RELATED APPLICATION

This application is a continuation of, and claims priority to U.S. patent application Ser. No. 15/865,589, filed Jan. 9, 2018, and entitled "Cryosphere" the contents of which is incorporated herein by reference in its entirety.

BACKGROUND

1. Field

This specification relates to a system, device or apparatus for cryogenically storing, transporting and/or shipping a liquid or gas below ambient temperatures.

2. Description of the Related Art

Lab technicians, scientists, medical professionals, such as doctors or nurses, and other technicians may cryogenically store and transport liquids or gases to various facilities, such as hospitals, labs and/or research facilities. When transporting the liquids or gases at cryogenic temperatures, the technicians and/or professionals store the liquid or gas in a dewar, which is used to hold the liquid or gas at a refrigerated or cryogenic temperature. The dewar may take several different forms including open buckets, flasks and/or self-pressurizing tanks. The dewar may be a double-walled metal or glass flask that has a vacuum between the walls. This provides thermal insulation between the walls.

The technician or professional may fill the dewar with the liquid or gas and package the dewar using shipping material. Then, the technician or professional provides the package including the dewar to a shipper to transport the contents to the final destination where it is unpacked. The liquid or gas, however, slowly boils so the dewar may have an opening on top, which is designed to allow the gas to escape. In addition, while being shipped, the dewar may be tilted or overturned resulting in the liquid or gas flowing out of the dewar.

Accordingly, there is a need for a system, device or apparatus to protect the liquid or gas in the dewar from evaporation and from pouring out while being transported.

SUMMARY

In general, one aspect of the subject matter described in this specification is embodied in a cryogenic storage system. The cryogenic storage system ("storage system") stores and/or transports a liquid or a gas. The storage system has an enclosure and a cavity. The storage system has a dewar that is positioned within the cavity of the enclosure. The dewar has a payload area that is configured to hold a liquid below ambient temperature. The dewar is configured to hold a liquid below ambient temperature and passively stabilize in an upright position. The dewar is formed with an inner wall and an outer wall and has an opening that allows access to the payload area.

These and other embodiments may optionally include one or more of the following features. The dewar may be shaped as a sphere and may have a center of mass or gravity within a bottom portion of the dewar, which passively stabilizes the dewar when the dewar is tilted, angled or rotated within the enclosure. The dewar may be a double-walled flask. The dewar may be a spherical dewar. The spherical dewar may be configured to return to the upright position within the enclosure when the enclosure is rotated or angled. The spherical dewar may have a bottom portion and a top portion. The bottom portion may weigh more than the top portion such that the spherical dewar remains upright or stabilizes when tilted or rotated. The enclosure may be shaped as a cube and may have multiple sides. The enclosure may have a circular opening on each side to provide access to the dewar when the dewar is placed inside the enclosure.

The storage system may have a removable vapor plug. The removable vapor plug may be configured to be inserted into the opening of the dewar to limit access to the cavity of the dewar. The removable vapor plug may have a handle portion and a neck. The storage system may have a temperature monitoring device. The temperature monitoring device may be configured to monitor temperature within the dewar and may be positioned within the neck. The temperature monitoring device may be configured to wirelessly connect with an electronic device and may transmit a temperature within the dewar to the electronic device.

The storage system may have a ball transfer device. The ball transfer device may be connected to and interface between the dewar and the enclosure. The ball transfer device may be configured to minimize friction between the dewar and the enclosure.

In another aspect, the subject matter is embodied in an enclosure for a dewar. The enclosure has a cavity that is configured to receive and enclose the dewar. The enclosure has multiple sides. Each side has an opening that allows access to the dewar when the dewar is inserted into the enclosure. The enclosure has a ball transfer device. The ball transfer device connects to the dewar and is configured to minimize friction between the dewar and the enclosure.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, apparatuses and devices for transporting and storing a liquid or gas, such as liquid nitrogen. The system, apparatus or device may be a cryogenic storage system that stores and transports liquid. Particular embodiments of the subject matter described in this specification may be implemented to realize one or more of the following advantages.

The cryogenic storage system may have an enclosure that is made from a polymeric material so that the enclosure is able to withstand cryogenic temperatures. That is, the polymeric material is resistant to brittleness and not as susceptible to shattering at cryogenic temperatures. The enclosure may hold or suspend a dewar that contains the liquid or gas. Moreover, the enclosure surrounds the dewar to protect the dewar from any impacts. The enclosure may freely suspend or hold the dewar, such that the dewar freely rotates and/or moves about within the enclosure without impacting the inner sides of the enclosure. Moreover, the dewar may be spherical and have passive stabilization. That is, the dewar may have a center of mass that is located directly opposite from the opening and a center of gravity that is at or near the bottom of the dewar near the center of mass so that the dewar remains in or returns to an upright or vertical position when tilted. By being able to freely rotate within the enclosure and by having passive stabilization, the dewar remains upright regardless of the orientation of the enclosure to prevent spillage. Moreover, by stabilizing the dewar upright, the cryogenic storage system reduces the amount of evaporation of the liquid within the dewar. For example, the cryogenic storage system reduces the nitrogen evaporation rate within the dewar, which extends the life of the dewar in a shipment.

Other benefits and advantages include that the enclosure has multiple faces that provide access to the dewar, which improves physical access to the opening of the dewar for inserting and/or removing the liquid or gas. Additionally, the dewar may have an electronic device that conveys and monitors the temperature inside the dewar and has a connection device that reduces the amount of friction between the enclosure and the dewar when the dewar freely rotates.

Figure 1:
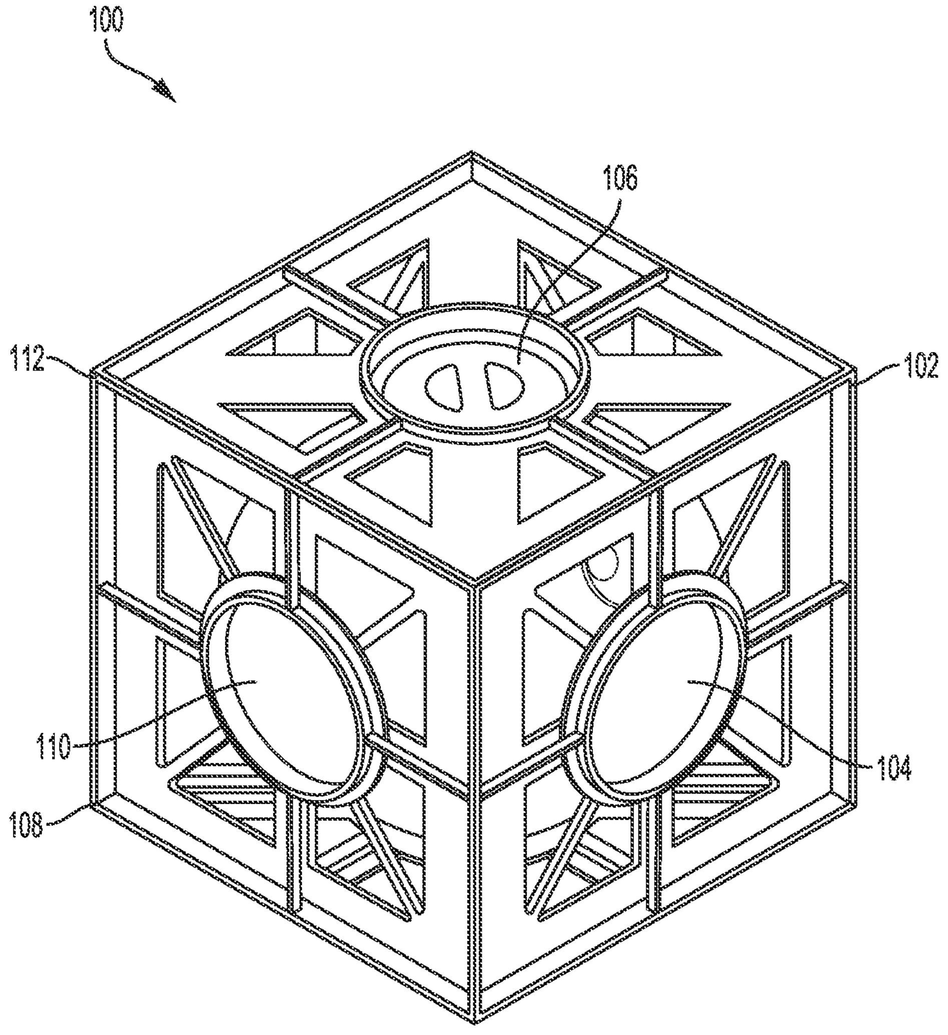
FIG. 1 shows an example cryogenic storage system according to an aspect of the invention.
Figure 2:
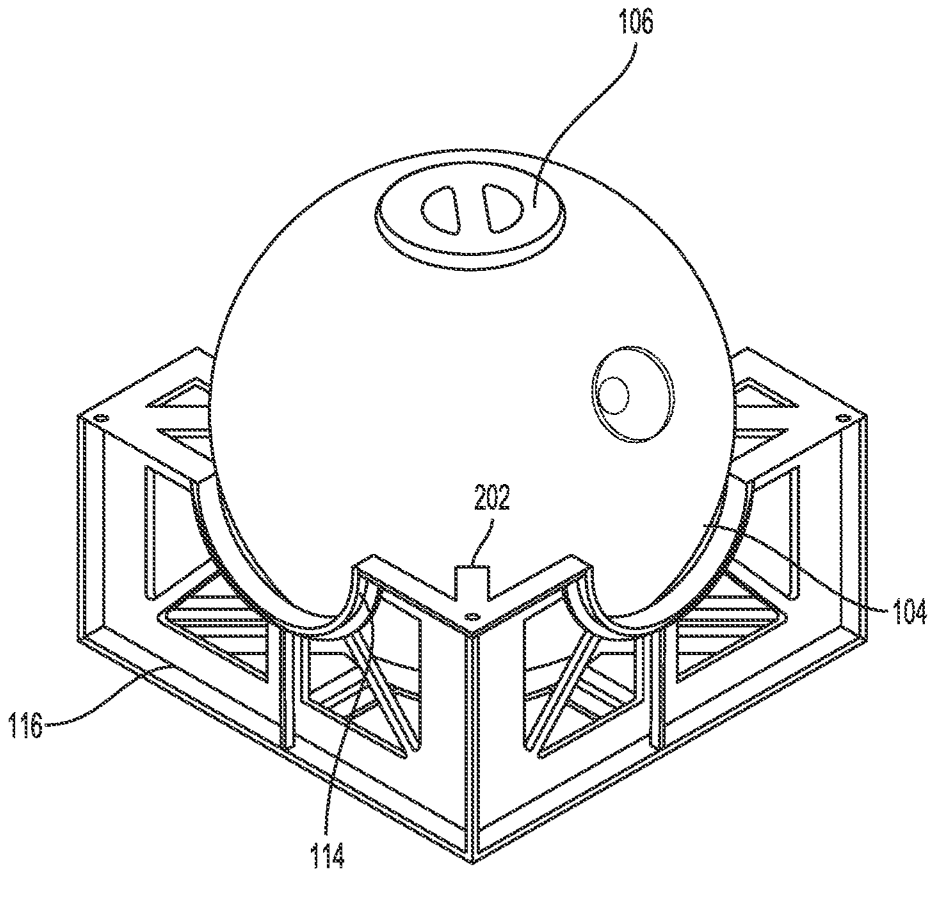
FIG. 2 shows a spherical dewar situated within the enclosure according to an aspect of the invention.

FIG. 1 shows a perspective view of the cryogenic storage system 100, and FIG. 2 shows a cross-sectional view of the cryogenic storage system 100. The cryogenic storage system ("storage system") 100 includes an enclosure 102, a dewar 104, such as a double-walled flask, and a vapor plug 106. The enclosure 102 is three-dimensional (3D) and may be shaped as a cube. The enclosure 102 may be shaped as any type of three-dimensional object, such as a cube, tetrahedron, dodecahedron or octahedron, and may be made from a polymeric material so that the enclosure 102 does not shatter at cryogenic temperatures.

The enclosure 102 has multiple sides 108 or faces. The sides 108 form a closed enclosure that surrounds or encloses the dewar 104. The sides 108 may be a planar or latticed surface that connects to the other sides to form the enclosure 102 and surround the dewar 104. The dewar 104 inserted into or placed into a cavity of the enclosure 102 so that the dewar 104 resides within the enclosure 102. The multiple sides 108 may snap together using one or more fasteners. The multiple sides 108 may snap together at one or more corners 112, for example. In some implementations, the enclosure may be formed from multiple modular pieces. The multiple modular pieces may be connected and/or fastened together to form the enclosure 102. The multiple sides may have one or more enclosure openings 110. The one or more enclosure openings 110 may be circular and/or shaped in the same shape as the dewar opening. The one or more enclosure openings 110 provide access to the dewar 104 as the dewar 104 rotates within the enclosure 102. Thus, the opening 402 of the dewar 104 may be access regardless of the orientation of the enclosure 102.

For example, the enclosure 102 is shaped as a cube and has 6 sides 108. Each side is connected to at least another side at a corner 112. On each side, there is an enclosure opening 110. The enclosure opening allows access to the vapor plug 106 and the dewar opening, when the dewar opening is aligned with the enclosure opening 110 on the side of the enclosure 102. Thus, as the dewar rotates within the cavity of the enclosure, the one or more enclosure openings 110 provide access to the vapor plug 106 and the dewar opening, when the one or more enclosure openings 110 align with the dewar opening.

The enclosure 102 may have an inner framework 114 and an outer framework 116. The outer framework 116 protects the dewar 104 from impacts, vibration and/or shocks. For example, the outer framework 116 separates the dewar 104 from other objects, such as other boxes or the side of a truck, when the enclosure 102 is shipped or stored. The inner framework 114 forms the cavity within the enclosure 102 where the dewar 104 is situated. The dewar may be suspended, placed or otherwise situated within the cavity of the inner framework 114 so that the dewar 104 is able to rotate within the cavity.

Figure 9:
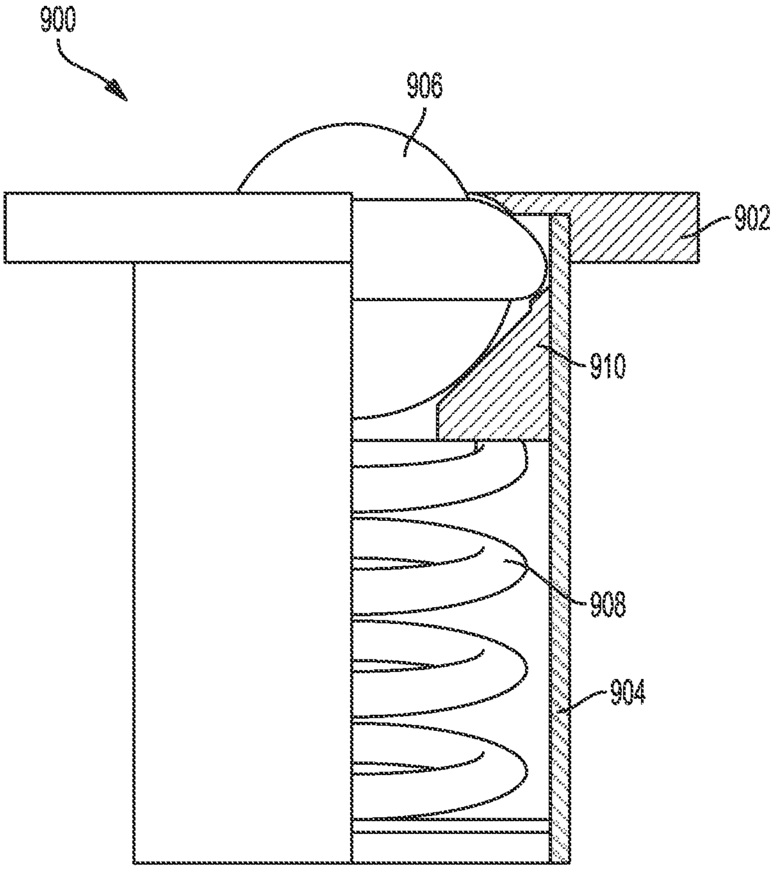
FIG. 9 is an example ball transfer device of the cryogenic storage system of FIG. 1 according to an aspect of the invention.

The storage system 100 may include a ball transfer device 900 that is connected between the enclosure 102 and the dewar 104. The ball transfer device 900 facilitates the movement of the dewar relative to the enclosure 102. The ball transfer device 900 may be positioned at an inner phalange or wing 202 that is between the enclosure 102 and the dewar and provide for a frictionless or near-frictionless surface. The ball transfer device 900 minimizes or eliminates friction between the dewar and the enclosure 102, which allows the dewar to freely move or rotate within the enclosure 102. FIG. 9 further describes the structure of the ball transfer device 900.

Figure 3:
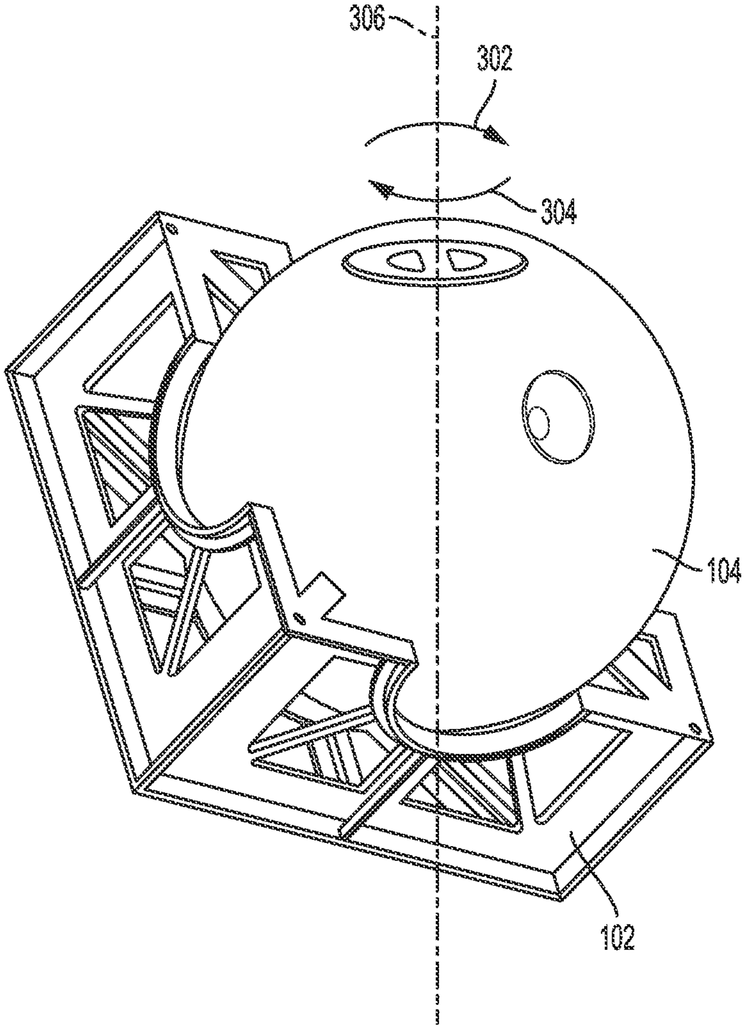
FIG. 3 shows the spherical dewar rotating within the enclosure according to an aspect of the invention.

The storage system 100 includes a dewar 104. The dewar 104 may be double-walled flask and may be shaped as a sphere or any other polyhedron. The dewar 104 may be situated centrally within a central cavity of the enclosure 102 and may freely rotate and/or move within the central cavity. The dewar 104 may rotate in the direction 302, 304 about a central vertical axis 306 or in any other direction three-dimensionally, as shown in FIG. 3 for example.

Figure 4:
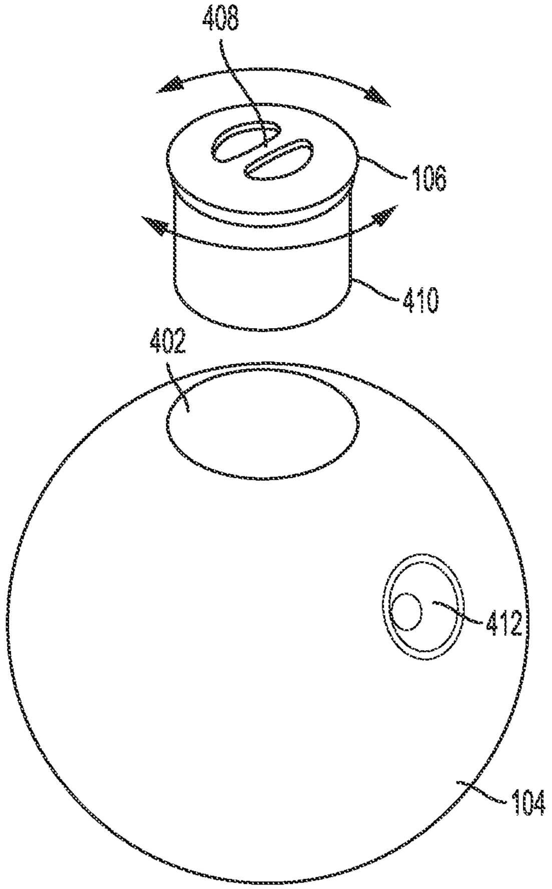
FIG. 4 shows an opened spherical dewar to allow the liquid or gas to be inserted according to an aspect of the invention.
Figure 5:
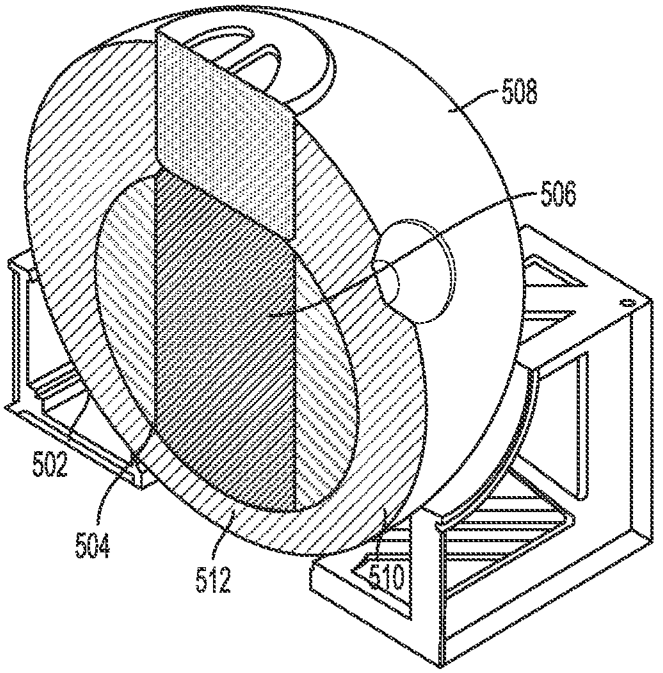
FIG. 5 shows a cross-sectional view of the cryogenic storage system of FIG. 1 according to an aspect of the invention.

The dewar 104 has an inner wall 504, an outer wall 502 and an opening 402. The storage system 100 may have a plug, such as the vapor plug 106, which may be inserted into the opening 402 to seal or partially seal the dewar 104 while allowing some gas to escape, as shown in FIG. 4 for example. The opening 402 leads to a cavity or payload area 506 that is within the dewar 104. FIG. 5 shows the payload area 506 in the cross-sectional view of the dewar 104. The dewar 104 may form a vacuum between the inner wall 504 and the outer wall 502 to hold or store a liquid or gas below ambient temperatures. The dewar 104 may have a pump-out port 412. The pump-out port 412 may be used to create a vacuum between the inner wall 504 and the outer wall 502 of the dewar 104, which allows the space in between the inner wall 504 and the outer wall 502 to be completely evacuated.

The dewar 104 has an inner wall 504 and an outer wall 502 with a vacuum between the inner wall 504 and the outer wall 502. The outer wall 502 has an opening 402 that allows a liquid or gas to be inserted or placed into the payload area 506. The opening 402 may be positioned opposite the center of gravity or mass 512 of the dewar 104, such that the opening 402 remains upright when the dewar 104 is passively stabilized. The opening 402 allows gases to escape from the payload area 506 of the dewar 104 to relieve the gas expansion within the dewar 104.

The inner wall 504 forms and/or encloses the payload area 506 within the dewar 104. The payload area 506 may be a cylindrical cavity within the dewar 104 that extends longitudinally from the top portion 508 through to the bottom portion 510 of the dewar 104. The payload area 506 holds or stores the liquid or gas below ambient temperatures. An absorbent material 606 may be at or surrounding a bottom portion of the payload area 506. The absorbent material 606 may maintain the temperature within the payload area 506 below the ambient temperature.

Figure 6A:
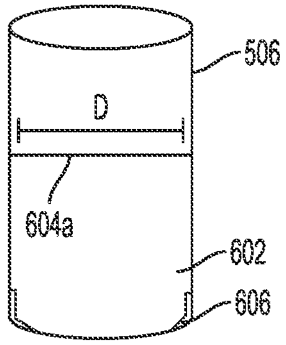
FIGS. 6A-6C show the liquid or gas within the payload area in different orientations according to an aspect of the invention.
Figure 6B:
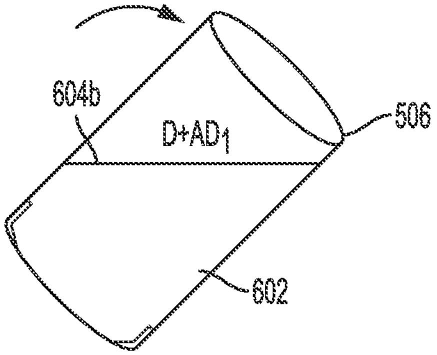
Figure 6C:
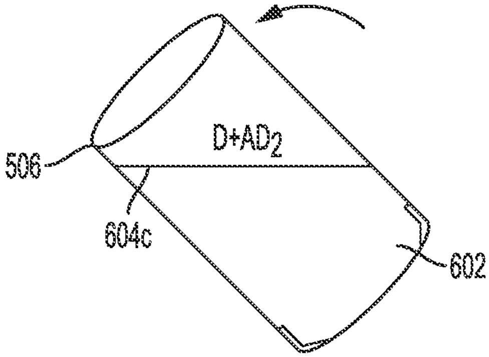

The dewar 104 has a top portion 508 and a bottom portion 510. The top portion 508 is where the opening 402 is located and remains upright due to passive stabilization of the dewar 104. The bottom portion 510 includes the center of gravity or mass 512. Since the center of gravity or mass 512 is located within the bottom portion 510 of the dewar 104, the dewar 104 stabilizes around the center of gravity or mass 512 so that the dewar 104 remains upright. By stabilizing the dewar 104 around the center of gravity or mass 512 regardless of the orientation of the enclosure 102, the storage system 100 reduces the amount and/or rate of evaporation of the liquid or gas and/or absorbent material, e.g., the nitrogen evaporation rate is reduced. The amount and/or rate of evaporation of the liquid or gas and/or absorbent material is based on the amount of the cross-sectional surface area 604*a-c* of the liquid or gas 602, as shown in FIGS. 6A-6C for example. Additionally, by having passive stabilization, the dewar 104 increases an amount of shipping density within a shipping container, as the dewar 104 may be enclosed in an enclosure 102 of any shape which allows the shipper to use any shape for the enclosure 102 that best fits the available space or empty volume within the shipping container.

FIG. 6A shows the liquid or gas 602 and the absorbent material 606 within the payload area 506 of the dewar 104 when the dewar 104 is upright. The absorbent material 606 may be positioned within or surrounding the bottom portion of the payload area 506 of the dewar 104. The cross-sectional surface area 604*a* of the liquid or gas 602 has a diameter, D, when the dewar 104 is upright because the payload area 506 is upright or vertical. If the payload area 506 were to be angled or tilted, as shown in FIGS. 6B and 6C for example, the liquid or gas 602 would have cross-sectional surface areas 604*b-c* of D+ΔD, respectively, that are greater than the cross-sectional surface area 602*a*, D, when the payload area 506 is upright or vertical. As the payload area 506 tilts or angles, the shape of the cross-sectional surface area 604*a* transitions from a circular shape due to the cylindrical nature of the payload area 506 to the elliptical shape of the cross-sectional surface areas 604*b-c*. The size of the elliptical cross-sectional surface areas 604*b-c* increase as the angle increases. The increased cross-sectional surface areas 602*b-c* result in an increased evaporation rate and/or amount of the liquid or gas 602 and/or an increased burn rate or amount of the absorbent material 606. The increased cross-sectional surface areas 604*b-c* expose more of the liquid or gas 602 to a higher temperature medium causing a faster burn rate for the absorbent material 606 to cool the liquid or gas 602. Moreover, the liquid and/or gas may spill out or escape from the opening 402 of the dewar 104 as the payload area 506 is tilted. Additionally, as liquid or gas 602 spills out and/or the cross-sectional surface area 602*b-c* increases, a partial vacuum is created, which draws in warm air that further increases the average temperature and causes a faster burn rate for the absorbent material 606 to cool the liquid or gas 602.

Since the dewar 104 within the storage system 100 has passive stabilization that maintains the dewar 104 in the upright position regardless of the orientation of the enclosure 102, the payload area 506 within the dewar 104 maintains the upright position or returns to the upright position when the dewar 104 is tilted, rotated and/or otherwise angled. Thus, the storage system 100 reduces the amount and/or rate of evaporation of the liquid or gas 602 and reduces the burn rate of the absorbent material 606 by maintaining the dewar 104 in the upright position and/or passively adjusting the dewar 104 so that the dewar 104 returns to or maintains the upright and/or vertical position. Moreover, by reducing the burn rate of the absorbent material 606, which may be nitrogen, the dynamic holding time of the dewar 104 increases. The dynamic holding time is the time that the dewar 104 maintains the internal temperature at or below −150° C. during transportation.

The storage system 100 includes a vapor plug 106. FIGS. 4, 7A and 7B show the vapor plug 106. The vapor plug 106 may have a handle portion 408 and a neck 410. The handle portion 408 may have a handle or grip that allows a user to twist the vapor plug 106 in a clockwise or counter clockwise direction to insert at least a portion of the neck 410 into the opening 402. The vapor plug 106 may be removable. That is, the vapor plug 106 may be inserted into the opening 402 of the dewar 104 to close or partially close the dewar 104 and prevent access to the payload area 506. The handle portion 408 and/or the neck 410 may be made from a non-conductive material, such as a polymer or fiberglass like material.

The vapor plug 106 may be turned or twisted clockwise and/or counter-clockwise, as shown in FIG. 4 for example. For example, the vapor plug 106 may be turned clockwise when inserted into the opening 402 to secure the vapor plug 106 within the opening 402 and turned counter-clockwise to remove the vapor plug 106 from the opening 402 to allow insertion of the liquid or gas into the payload area 506. In another example, the vapor plug 106 may be turned counter-clockwise when inserted into the opening 402 to secure the vapor plug 106 within the opening 402 and turned clockwise to remove the vapor plug 106 from the opening 402. The vapor plug 106 may be inserted into the opening 402 such that there remains a gap that allows gas to escape to prevent pressure from building up as the liquid within the payload area 506 evaporates.

Figure 7:
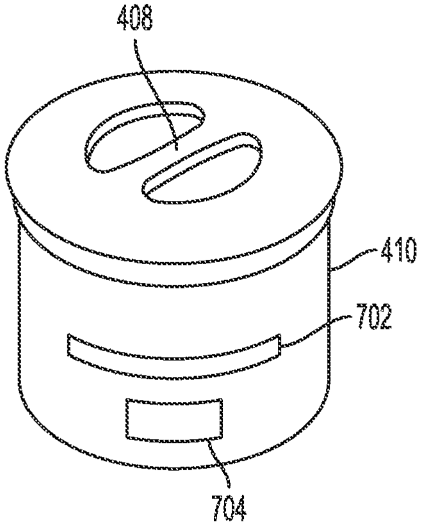
FIG. 7 is an example vapor plug of the cryogenic storage system of FIG. 1 according to an aspect of the invention.

The vapor plug 106 may have a locking device 704, as shown in FIG. 7. The locking device 704 may be positioned on the neck of the vapor plug 106. The locking device 704 may be one or more magnets that interlock with one or more other magnets within a top inner portion of the payload area 506 of the dewar 104. The magnets may have opposing polarities so that when vapor plug 106 is turned in certain position within dewar 104 the magnets lock vapor plug within the dewar 104. Conversely, when vapor plug 106 is rotated about its axis to another position, the opposing polarity of the magnets may force vapor plug out of dewar 104.

The locking device 704 locks when the vapor plug 106 is inserted within the payload area 506. Since there may be a gap between the vapor plug 106 and the inner portion of the payload area 506 of the dewar 104, the locking device 704 locks the vapor plug 106 in place with the dewar 104 to prevent the vapor plug 106 from falling out when the dewar 104 is oriented or rotated in different directions. The gap between the vapor plug 106 and the dewar 104 allows gas to escape due to the expansion of the gas or evaporation of the liquid within the payload area 506 to prevent pressure from building up within the payload area 506.

The storage system 100 may include an electronic thermocouple 702, which may positioned, embedded or included within, or connected to the neck 410 of the vapor plug 106. The electronic thermocouple 702 may be an electronic device or sensor that measures and monitors the temperature within the dewar 104. The electronic thermocouple 702 may wireless transmit and/or communicate with another electronic device, such as a smart data logger, using a wireless protocol. The electronic thermocouple 702 may communicate and provide the temperature to the smart data logger and/or may receive instructions from the smart data logger to monitor the temperature. The smart data logger may display or otherwise communicate the temperature to a user or another electronic platform. This allows for real-time monitoring of the temperature within the dewar 104 by other individuals.

Figure 8A:
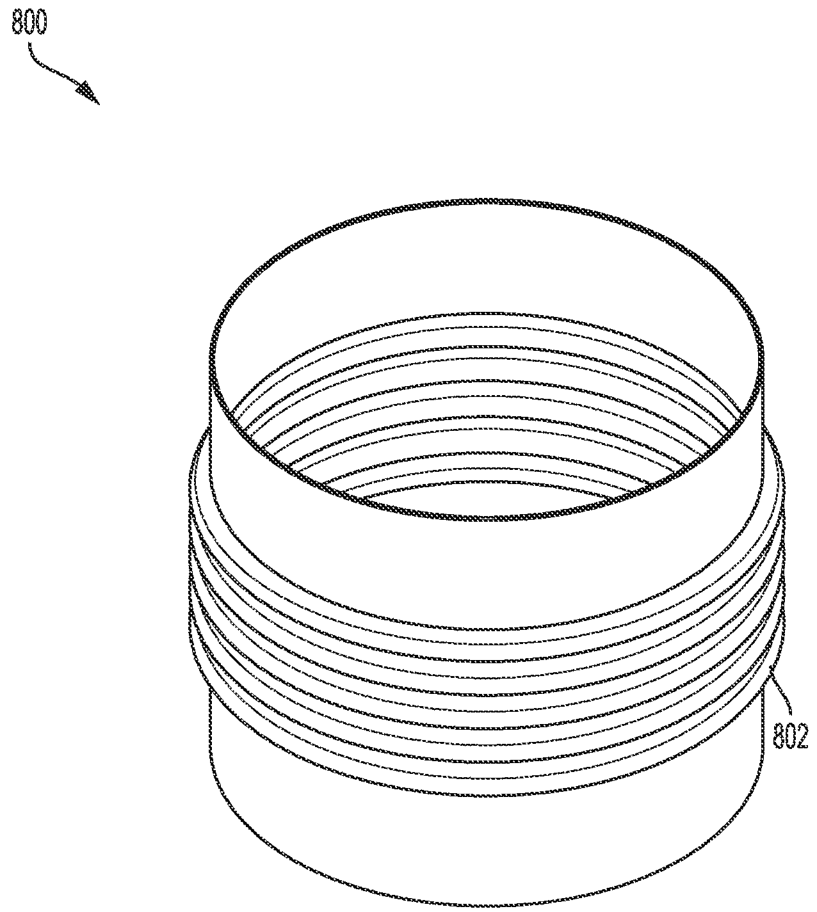
FIG. 8A is an example corrugated neck tube of the cryogenic storage system of FIG. 1 according to an aspect of the invention.
Figure 8B:
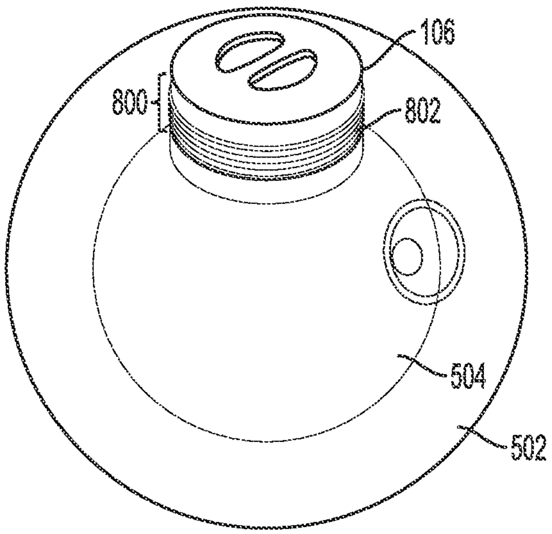
FIG. 8B shows the corrugated neck tube connected to the dewar of the cryogenic storage system of FIG. 1 according to an aspect of the invention.

The storage system 100 may include a corrugated neck tube 800, as shown in FIGS. 8A-8B for example. The corrugated neck tube 800 may be thin-walled. The corrugated neck tube 800 connects the inner wall 504 with the outer wall 502 of the dewar 104. The corrugated neck tube 800 reduces the overall height of the neck tube but keeps the overall length of the path, which conducts the heat, the same as a straight neck tube. The corrugated neck tube 800 may have a serpentine path 802 that provides the heat conduction. By reducing the height of the neck tube but keeping the overall path length the same as a straight neck tube, the corrugated neck tube 800 reduces the overall size of the dewar 104. Moreover, by keeping the overall path length for heat conduction the same as a straight neck tube, the corrugated neck tube 800 reduces the amount of heat that is conducted into the dewar 104. Thus, the corrugated neck tube 800 provides for the same heat conduction with a shorter neck tube (e.g., shorter overall height or size) than a straight neck tube of similar overall path length. For example, the height of the corrugated neck tube 800 may be 2-3 inches long, whereas, the overall path length for heat conduction may be 6 inches long because the overall path length for heat conduction may be a serpentine path along the thin-walled corrugated neck tube.

The storage system 100 includes a ball transfer device 900, as shown in FIG. 9 for example. The ball transfer device 900 may be connected to the enclosure 102 at the inner phalange or wing 202. The ball transfer device 900 may provide an interface between the enclosure 102 and the dewar 104 and allow the dewar 104 to freely rotate within the cavity of the enclosure 102.

The ball transfer device 900 may have a head 902 and a body 904. The head 902 and the body 904 may be shaped as cylinders. The diameter of the head 902 may be greater than the diameter of the body 904. The ball transfer device 900 may be inserted into a hole or opening of the inner phalange or wing 202. For example, the body 904 may be inserted into the opening and the head 902 may form a seal around the opening of the inner phalange or wing 202. The head 902 and body 904 may have an opening and a cavity where a ball bearing 906 and spring 908 reside.

The ball transfer device 900 may have a ball bearing 906, a cup 910 and a spring 908 that sits or rests in a cavity of the ball transfer device 900. The ball bearing 906 may have a top portion and a bottom portion. The top portion of the ball bearing 906 may protrude from the head 902 of the ball transfer device 900. The top portion of the ball bearing 906 that protrudes contacts the dewar 104 when the dewar 104 sits in the cavity of the enclosure 102. The ball bearing 906 minimizes the friction between the enclosure 102 and the dewar 104 allowing the dewar 104 to freely rotate or move within the enclosure 102. The ball bearing 906 provides for a frictionless or a reduced friction surface. The bottom portion of the ball bearing 906 that is within the cavity of the body 904 may rest on the cup 910, which engages with the spring 908.

The cup 910 interfaces between a bottom portion of the ball bearing 906 and the spring 908, such that when a force is applied on the top portion of the ball bearing 906, the bottom portion of the ball bearing 906 presses against the cup 910, which provides a downward force on the spring 908 so that the spring 908 contracts. This allows the dewar 104 to freely rotate within the enclosure 102 and allows the enclosure 102 to absorb shocks and vibrations during storage and/or transport. When the dewar 104 presses against the ball bearing 906, the ball bearing 906 further enters into the cavity of the body 904 while the spring 908 further contracts. This allows the dewar 104 to jostle instead of remain rigid so that any shocks or vibrations are absorbed. When the event causing the shocks or vibrations has passed, the spring 908 returns or expands back into a normal state and keeps the dewar 104 positioned within the cavity of the enclosure 102. Moreover, the one or more ball bearings 906 allow the dewar 104 to rotate or angle so that the dewar 104 remains passively stabilized and upright regardless of the orientation of the enclosure 102.

The spring 908 may contract when a downward force is applied to the ball bearing 906, such as when the dewar 104 exerts an outward force on the ball bearing 906 due to shocks or vibrations on the enclosure 102. For example, when the enclosure 102 is moved, shifted or dropped a vibrational force is exerted on the enclosure 102. If the dewar 104 moves or shifts in response to the vibrational force, the dewar 104 may exert an outward force on the ball transfer device 900, and instead of violently contacting the enclosure 102, the dewar 104 exerts a force on the ball bearing 906, which retracts within the cavity of the body 904 and causes the spring 908 to contract and absorb the force.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A storage system for storing a substance at a temperature below an ambient temperature, comprising:

an enclosure having a cavity;

a container that is positioned within the cavity of the enclosure and configured to passively stabilize in an upright position, the container defining a payload area inside the container to hold the substance at the temperature below the ambient temperature, the container comprising:

a top portion;

a bottom portion that weighs more than the top portion and is configured to stabilize the container in an upright position when an enclosure enclosing the container is tilted, angled or rotated;

an inner wall that forms the payload area;

an outer wall, the outer wall and the inner wall having an opening that allows access to the substance in the payload area; and a plug having a neck that is inserted into the opening, wherein the plug includes a locking device that locks the plug in place and maintains a gap between the neck and the inner wall that allows gas to escape, wherein the locking device includes one or more magnets embedded within an outer periphery of the neck, wherein the one or more magnets embedded within the outer periphery of the neck interlock with one or more other magnets within the container, wherein the one or more magnets embedded within the outer periphery of the neck of the plug and the one or more other magnets within the container are configured to maintain the gap between the neck of the plug and the inner wall with the plug in a first position, and wherein the one or more magnets embedded within the outer periphery of the neck of the plug and the one or more other magnets within the container are configured to maintain the plug in a location at least partially out of the container with the plug in a second position different from the first position.

2. The storage system of claim 1, wherein the container comprises a spherical dewar.

3. The storage system of claim 1, wherein the enclosure is a cube, wherein the enclosure has a plurality of sides and an opening to provide access to the container when the container is placed inside the cubicle enclosure.

4. The storage system of claim 2, further comprising:

a corrugated neck tube providing the opening and connecting the inner wall and the outer wall, wherein the corrugated neck tube has a serpentine path configured to reduce an amount of heat conducted into the container.

5. The cryogenic storage system of claim 1, further comprising:

a ball transfer device that is connected to and interfaces between the container and the enclosure, the ball transfer device configured to minimize friction between the container and the enclosure.

6. A container for storing a liquid at a temperature below an ambient temperature, comprising:

a wall that forms a payload area configured to hold the liquid at the temperature below the ambient temperature;

the wall having an opening that allows access to the liquid in the payload area;

a plug having a neck that is inserted into the opening and a locking device that locks the plug in place, prevents the plug from falling out when the container is oriented or rotated in different directions, and maintains a gap between the neck and the wall that allows gas to escape when the liquid evaporates; and wherein the locking device includes one or more magnets embedded within an outer periphery of the neck, wherein the one or more magnets embedded within the outer periphery of the neck interlock with one or more other magnets within the wall of the container, wherein the one or more magnets embedded within the outer periphery of the neck of the plug and the one or more other magnets within the wall of the container are configured to maintain the gap between the neck of the plug and the wall with the vapor plug in a first rotational position, and wherein the one or more magnets embedded within the outer periphery of the neck of the plug and the one or more other magnets within the wall of the container are configured to maintain the vapor plug in a location at least partially out of the container with the plug in a second rotational position different from the first rotational position.

7. The container of claim 6, further comprising a top portion and a bottom portion that weighs more than the top portion and that is configured to stabilize the container in an upright position when the container is tilted, angled, or rotated within an enclosure regardless of an orientation of the enclosure.

8. The container of claim 6, further comprising an outer wall and a vacuum port that is configured to produce a vacuum insulation between the wall and the outer wall.

9. The container of claim 6, wherein the container is a spherical dewar.

10. The container of claim 6, wherein the one or more magnets embedded within the outer periphery of the neck of the plug and the one or more other magnets within the wall of the container have opposing polarities, wherein the opposing polarities are configured to lock the plug in the first rotational position within the container and are configured to maintain the plug in the location at least partially out of the container with the plug in the second rotational position.

11. The container of claim 6, wherein the container has a center of gravity or mass within a bottom portion of the container.

12. A container for storing a substance at a temperature below an ambient temperature, comprising:

an inner wall that forms a payload area configured to hold the substance at the temperature below the ambient temperature;

an outer wall;

a neck tube that connects the outer wall and the inner wall and provides an opening through the outer wall and the inner wall that allows access to the substance in the payload area; and a plug having a neck that is inserted into the opening, wherein the plug includes a locking device that locks the plug in place and maintains a gap between the neck and the inner wall that allows gas to escape, wherein the locking device includes one or more magnets embedded within an outer periphery of the neck, wherein the one or more magnets embedded within the outer periphery of the neck interlock with one or more other magnets within the container, wherein the one or more magnets embedded within the outer periphery of the neck of the plug and the one or more other magnets within the container are configured to maintain the gap between the neck of the plug and the inner wall with the plug in a first position, and wherein the one or more magnets embedded within the outer periphery of the neck of the plug and the one or more other magnets within the container are configured to maintain the plug in a location at least partially out of the container with the plug in a second position different from the first position.

13. The container of claim 12, wherein the neck tube is corrugated and includes a serpentine path that connects the inner wall with the outer wall.

14. The container of claim 12, wherein the plug is removable from the opening.

15. The container of claim 12, wherein the plug further comprises a locking device that locks the plug in place, prevents the plug from falling out when the container is oriented or rotated in different directions, and maintains a gap between the neck and the inner wall that allows gas to escape when the liquid evaporates.

16. The container of claim 12, further comprising an electronic thermocouple embedded within the neck of the plug.

17. The container of claim 12, further comprising:

a top portion;

a bottom portion that weighs more than the top portion and that is configured to stabilize the container in an upright position when an enclosure containing the container is tilted, angled or rotated, regardless of an orientation of the enclosure.

18. The container of claim 12, wherein the substance is a liquid.

* * * * *